US012115133B2

(12) United States Patent
Chike-Obi et al.

(10) Patent No.: US 12,115,133 B2
(45) Date of Patent: Oct. 15, 2024

(54) BABY BOTTLE SYSTEM

(71) Applicant: Grio, Inc., Austin, TX (US)

(72) Inventors: Oluwadara B Chike-Obi, Austin, TX (US); Lydia M Contreras, Austin, TX (US); Deepak Selvaraj, Austin, TX (US); Anna D Cardinal, Austin, TX (US)

(73) Assignee: Grio, Inc., Austin, TX (US)

( * ) Notice: Subject to any disclaimer, the term of this patent is extended or adjusted under 35 U.S.C. 154(b) by 0 days.

(21) Appl. No.: 17/404,010

(22) Filed: Aug. 17, 2021

(65) Prior Publication Data

US 2022/0047463 A1 Feb. 17, 2022

Related U.S. Application Data

(60) Provisional application No. 63/066,493, filed on Aug. 17, 2020.

(51) Int. Cl.
*A61J 9/06* (2006.01)
*A61J 11/00* (2006.01)
*A61J 11/04* (2006.01)

(52) U.S. Cl.
CPC ........... *A61J 9/0607* (2015.05); *A61J 11/003* (2013.01); *A61J 11/005* (2013.01); *A61J 11/04* (2013.01)

(58) Field of Classification Search
CPC ........ A61J 9/0607; A61J 9/06; A61J 11/0035; A61J 11/005; A61J 11/003; A61J 11/04; A61J 11/00; A47G 19/025
See application file for complete search history.

(56) References Cited

U.S. PATENT DOCUMENTS

| | | | | |
|---|---|---|---|---|
| 3,082,770 A * | 3/1963 | Straub | A61J 11/006 215/11.1 |
| 4,655,715 A * | 4/1987 | Van de Carr | A61J 9/0607 248/102 |
| 6,666,417 B1 * | 12/2003 | Wright | A61J 9/0607 248/407 |
| 6,960,171 B2 * | 11/2005 | Sanders | A63H 33/006 351/203 |
| 7,122,045 B2 * | 10/2006 | Randolph | A61J 11/0035 215/11.5 |
| 8,357,117 B2 * | 1/2013 | Sokal | A61J 7/0053 604/74 |
| 9,167,925 B2 * | 10/2015 | Rafnson | A47G 19/025 |
| 2002/0096529 A1 * | 7/2002 | Daubenthaler | A47G 19/025 220/751 |

* cited by examiner

*Primary Examiner* — James N Smalley
*Assistant Examiner* — Jennifer Castriotta
(74) *Attorney, Agent, or Firm* — Traverse Legal, PLC

(57) ABSTRACT

A baby bottle system including a bottle assembly and a detachable unit. The baby bottle system is configured to enhance a baby's feeding routine, simulate a baby's cognitive and emotional development, and prevent nipple/bottle confusion. The detachable unit includes an opening to receive an end portion of a baby bottle and a compartment for receiving an accessory that stimulates one or more of the senses of the baby.

6 Claims, 15 Drawing Sheets

300

BABY BOTTLE SYSTEM

CROSS REFERENCE TO RELATED APPLICATIONS

The present application claims the benefit to U.S. Provisional Patent Application No. 63/066,493 filed on Aug. 17, 2020, which is incorporated herein by reference in its entirety.

FIELD

The present disclosure generally relates to a baby bottle system including a bottle assembly and a detachable unit, the baby bottle system stimulates a baby's cognitive and emotional development during feeding.

BACKGROUND

The early years of a child's life are very important for later health and development due to how fast a child's brain grows. As a result, a baby's early experiences and environmental exposures play a significant role in the baby's brain growth and cognitive development. For example, the sense of smell is one of the earliest senses that a baby develops. Since the sense of smell is related to the part of the brain that controls memory, it is a powerful way to strengthen the bond between parents and their baby.

Despite the fact that babies spend about 5-7 hours of the day feeding, existing baby bottles are only configured for feeding. Conventional baby bottles fail to promote a baby's cognitive and emotional development during the often grueling and time-consuming process of feeding.

Furthermore, nipple/bottle confusion sometimes arises when a bottle-fed baby "forgets" how to nurse on a mother's nipple. This occurs because breastfeeding requires far more vigorous mouth and tongue motions than does bottle-feeding. Thus, a baby who is exposed to conventional bottle nipples can fail to properly nurse.

Consequently, there is a need for a baby bottle system that may (i) enhance a baby's feeding routine; (ii) stimulate a baby's cognitive and emotional development; and (iii) prevent nipple/bottle confusion.

SUMMARY

What is provided is a baby bottle system including a bottle assembly and a detachable unit. The baby bottle system disclosed herein is configured to enhance a baby's feeding routine, stimulate a baby's cognitive and emotional development, and prevent nipple/bottle confusion.

In an embodiment, a baby bottle system includes a bottle assembly including a bottle adapted to contain a volume of liquid or food, wherein the bottle has an open first end, a closed second end, and a body interposed between the first and second ends. The bottle assembly also includes a nipple engaged with the bottle, the nipple having a tip having an outer surface and an inner surface, wherein the outer surface is thicker at a first end of the tip than at a second end of the tip, and wherein the second end of the tip has a hole therethrough; and a base connected to the tip, wherein the base includes a first region having a curved shape; and a second region connected to the first region, wherein the second region has a textured surface. The baby bottle system also includes a ring mounted over a portion of the nipple and onto the first end of the bottle, wherein the ring is configured to sealingly engage the nipple to the bottle; and a detachable unit configured to stimulate one or more senses of a baby, the detachable unit including a cavity configured to receive and retain the second end of the bottle; and an outer rim defining the cavity.

In some embodiments, an accessory comprises a cloth (e.g., scented cloth), a fabric, a card (e.g., flash card), a sound chip, or any combinations thereof. The accessory is intended to stimulate the cognitive and emotional development of the baby while the baby is feeding from the bottle.

In an embodiment, a baby bottle assembly includes a bottle adapted to contain a volume of liquid or food, wherein the bottle has an open first end, a closed second end, and a body interposed between the first and second ends. The bottle assembly also includes a nipple engaged with the bottle, the nipple including a tip having an outer surface and an inner surface, wherein the outer surface is thicker at a first end of the tip than at a second end of the tip, and wherein the second end of the tip has a hole therethrough; and a base connected to the tip, wherein the base includes a first region having a curved shape; and a second region connected to the first region, wherein the second region has a textured surface. The bottle assembly also includes a ring mounted over a portion of the nipple and onto the first end of the bottle, wherein the ring is configured to sealingly engage the nipple to the bottle.

BRIEF DESCRIPTION OF THE DRAWINGS

The above, as well as other advantages of the present disclosure, will become readily apparent to those skilled in the art from the following detailed description when considered in light of the accompanying drawings in which.

DETAILED DESCRIPTION

Figure 1:
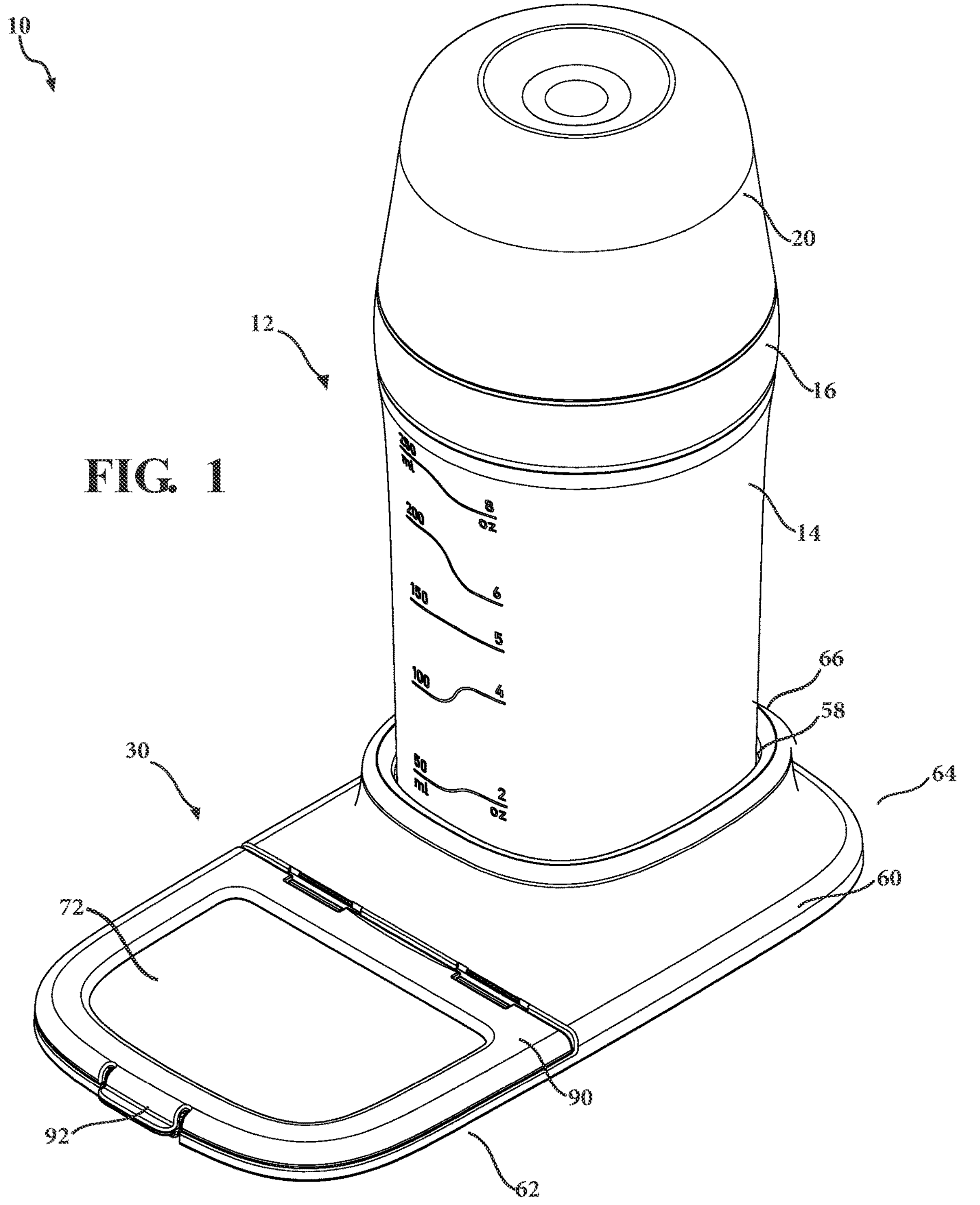
FIG. 1 illustrates a schematic perspective view of a baby bottle system including a bottle assembly and a detachable unit according to an embodiment of the disclosure.

It is to be understood that the present disclosure may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

A baby bottle system including various embodiments of bottle assemblies and detachable units are provided herein. In an embodiment, the detachable unit is a base. In another embodiment, the detachable unit is a ring. The various detachable units disclosed herein are configured for use with a plurality of cognitive/bonding attachments that are configured to evoke various sensorial responses in a baby. The attachments disclosed herein may stimulate a baby's sense of touch, sight, hearing, smell, taste, and any combinations thereof.

FIGS. 1-9 are views of a baby bottle system 10 including a bottle assembly 12 and a detachable unit 30 according to an embodiment of the disclosure. In this embodiment, the detachable unit 30 is a detachable base made of polypropylene. The bottle assembly 12 comprises a bottle 14, a ring 16, a feeding apparatus or nipple 18, and a bottle cap 20. The bottle 14 is selectively inserted into an opening 58 on a first portion 64 of the detachable unit 30. The bottle 14 may be securely attached within the opening 58 so that the bottle 14 remains connected to the detachable unit 30 when it is tipped and/or angled in use.

The bottle 14 may be various shapes and sizes, such as being 4 ounces or 8 ounces. The bottle 14 is adapted to contain a certain volume of liquid or food therein. The bottle 14 may hold any type of liquid or food, such as breast milk or formula.

In an embodiment, the bottle 14 is made from an impact-resistant plastic material, such as Tritan® plastic. One of ordinary skill in the art would appreciate that other embodiments of the bottle 14 may have a variety of configurations and sizes, be made from a variety of suitable materials, and may hold various volumes of liquid or food.

Figure 2:
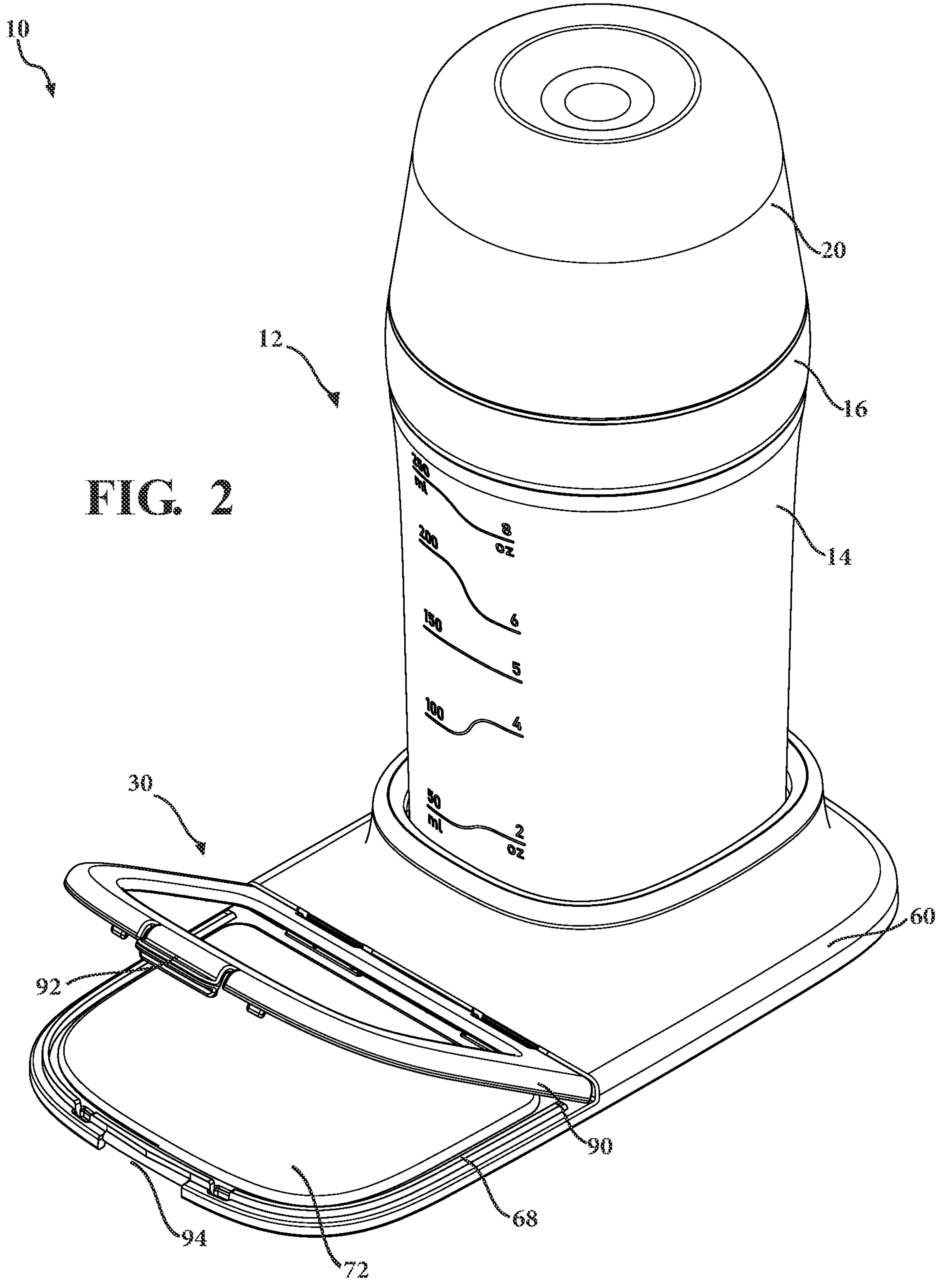
FIG. 2 illustrates another schematic perspective view of the baby bottle system illustrated in FIG. 1.

As best seen in FIGS. 1 and 2 and as a non-limiting example, one or more accessories 72 are removably inserted into a compartment 68 found on a second portion 62 of the detachable unit 30. The one or more accessories 72 are designed to stimulate a baby's cognitive and emotional development when the baby is feeding from the bottle 14. In this embodiment, the one or more accessories 72 are scented pieces of cloth/fabric, wherein the scented cloth/fabric 72 is removably inserted into the detachable unit 30. The scented cloth/fabric 72 may be infused with the scent of a baby's mother in order to stimulate the emotional development of the baby by strengthening the connection between parents and the baby. For example, each scented cloth 72 may comprise two layers of plush fabric stitched together and hemmed.

In other embodiments as described and shown herein, the accessories 72 may comprise cards, such as flashcards, sound chips, and the like. Cards may have any image or design of any color in order to stimulate the cognitive and emotional development of a baby while the baby is feeding from the bottle 14.

As best seen in FIGS. 1 and 2 and as a non-limiting example, the scented cloth 72 is removably inserted into and retained within the compartment 68 on the detachable unit 30. An outer frame 60 surrounds the first and second portions 64, 62 of the detachable unit 30. The second portion 62 is substantially rectangular in shape such that the second portion 62 may receive and retain accessories 72, such as cloths and cards, having various shapes and sizes.

Figure 7:
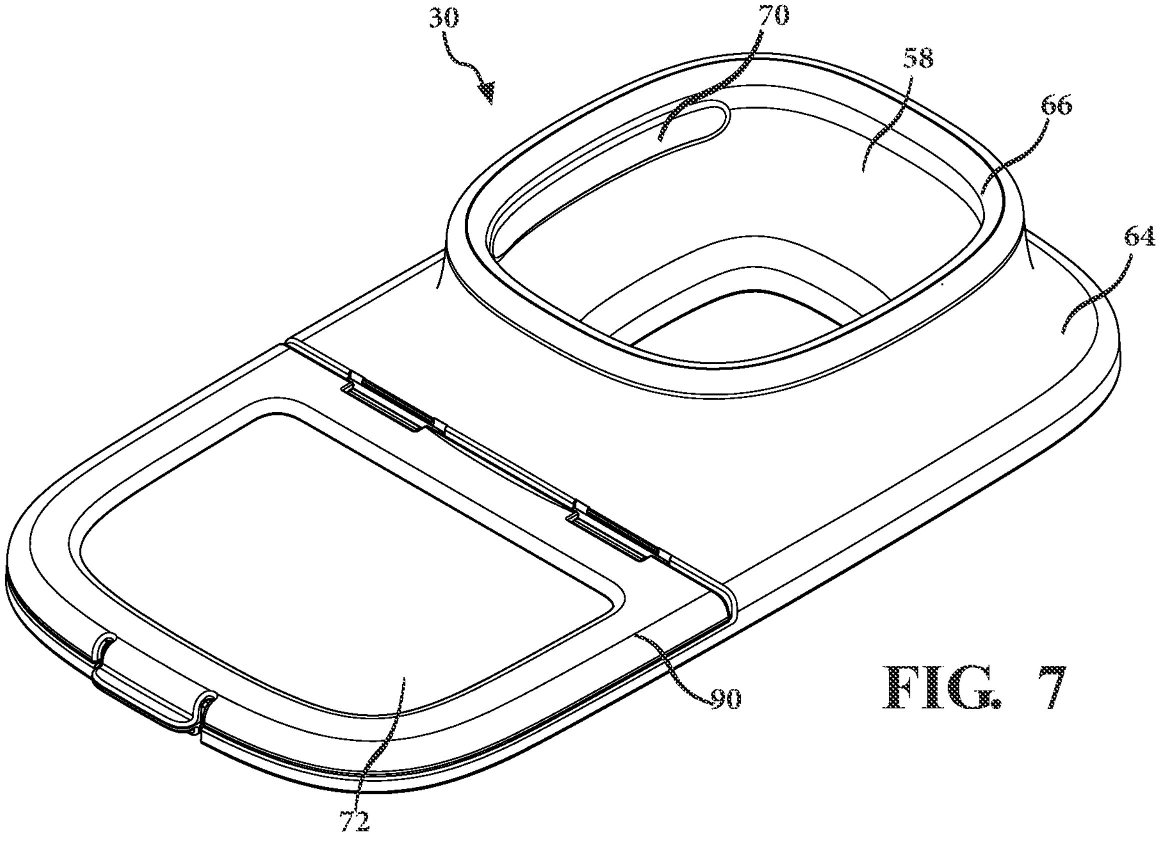
FIG. 7 illustrates a schematic perspective view of the detachable unit illustrated in FIGS. 1-3.
Figure 8:
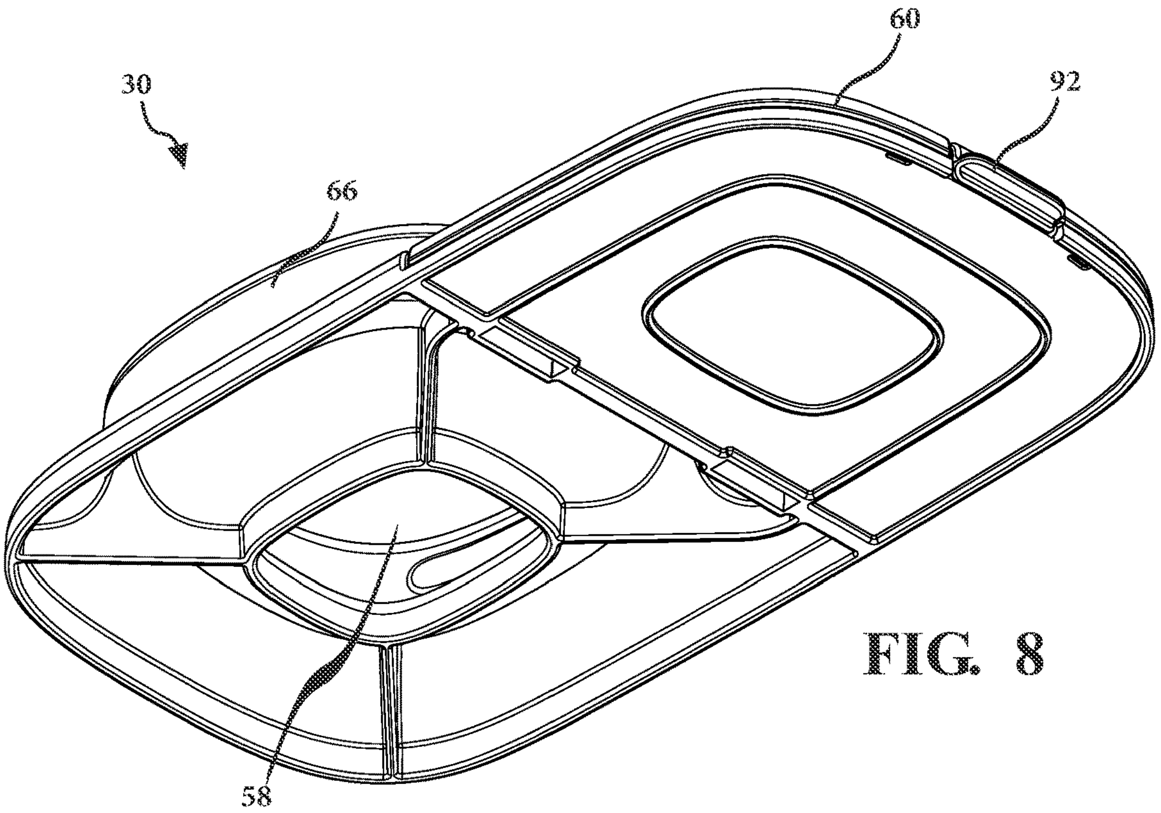
FIG. 8 illustrates a schematic bottom perspective view of the detachable unit illustrated in FIGS. 1-3 and 7.
Figure 9:
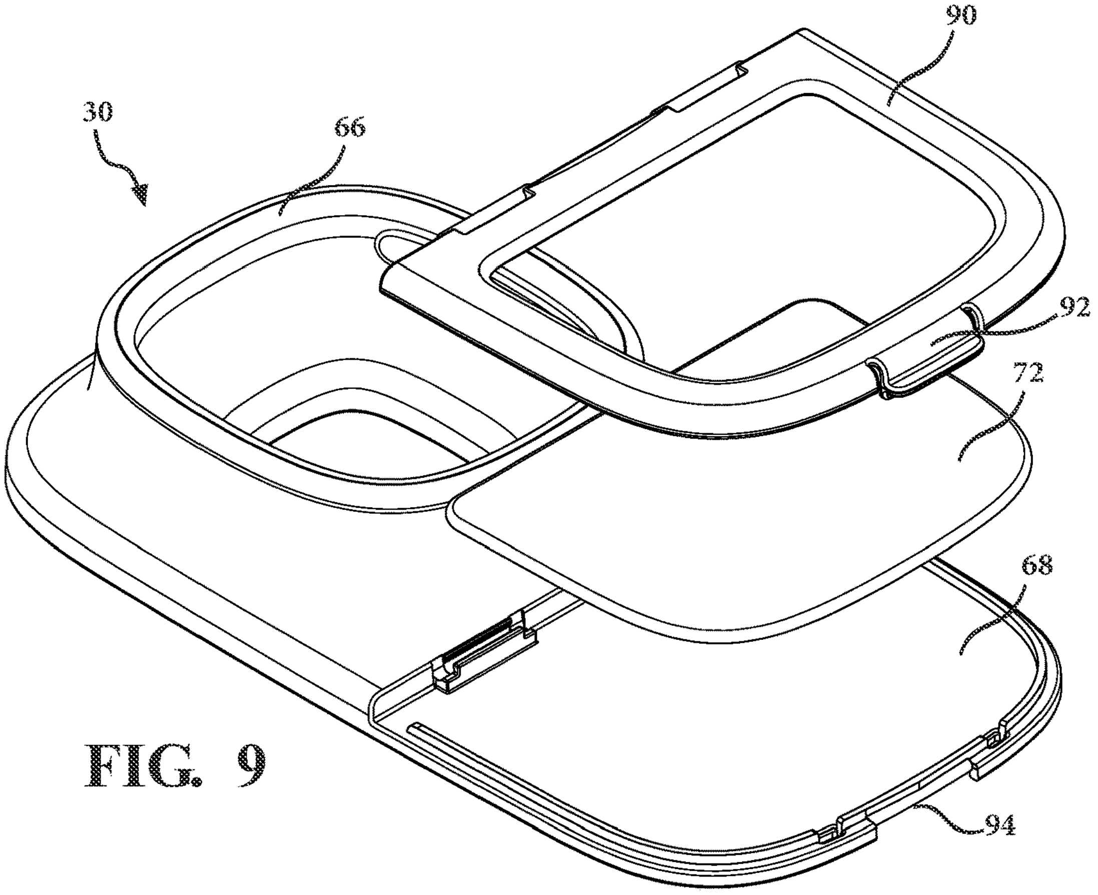
FIG. 9 illustrates a schematic exploded view of the detachable unit illustrated in FIGS. 1-3, 7, and 8.

The detachable unit 30 also includes an adjustable inner frame 90 positioned on top of and surrounding portions of the compartment 68 on the second portion 62. The inner frame 90 includes a latch 92 that is configured to attach the inner frame 90 to the outer frame 60. As best seen in FIGS. 1 and 7, the inner frame 90 is shown in a lowered position, wherein the inner frame 90 is attached to and positioned on top of the outer frame 60. In this position, the latch 92 is positioned in a gap 94 within the outer frame 60 and attaches a portion of the inner frame 90 to a portion of the outer frame 60.

As best seen in FIG. 2, the inner frame 90 is shown in a raised position, wherein latch 92 is not positioned within gap 94 and the inner frame 90 is detached from the outer frame 60. In this position, an accessory (i.e., scented cloth) 72 may be selectively inserted within the compartment 68. After the accessory 72 is inserted into a desired position in the compartment 68, the inner frame 90 may be readily lowered towards and secured to the outer frame 60 using the latch 92 by an operator of the system 10.

Figure 3:
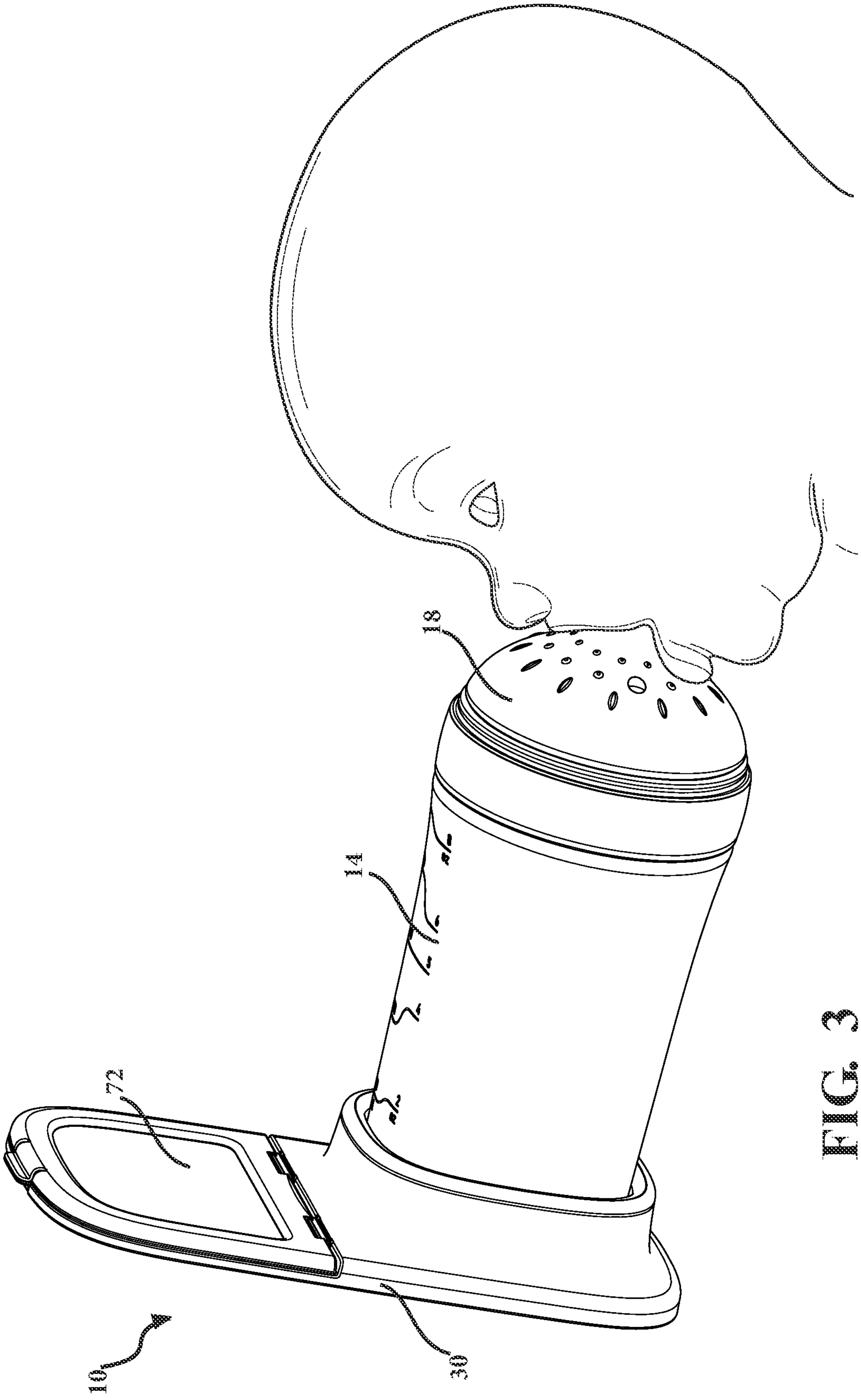
FIG. 3 illustrates a schematic perspective view of the baby bottle system illustrated in FIGS. 1 and 2 in operation.

As best seen in FIG. 3, the compartment 68 and the scented cloth 72 are positioned in close proximity to a baby in operation so that the baby can smell the scented cloth 72 and stimulate the baby's cognitive and emotional development when the baby is feeding from the bottle 14. The bottle 14 is angled towards the baby such that the compartment 68 with the scented cloth 72 is above the bottle 14 and also angled towards the baby. The latch 92 ensures that the inner frame 90 remains attached to the outer frame 60 and keeps the accessory 72 positioned within the compartment 68 while the baby is feeding from the bottle 14.

As best seen in FIG. 7 and as a non-limiting example, the first portion 64 extends upward at a slope from the second portion 62 of the detachable unit 30. The first portion 64 includes an outer rim 66 defining the opening 58 for receiving the bottle 14. The opening 58 may include a rubber strip 70 extending at least partially on an inner surface therein. The rubber strip 70 is adapted to interact with one or more portions on the bottle 14 to securely retain the bottle 14.

In an alternative embodiment, a detachable unit may include one or more slits positioned on the bottom side of the detachable unit. One or more accessories may be slidably inserted into the one or more slits. These detachable units made from one-piece and the accessory may be selectively inserted through the one or more slits or the detachable units may be made from multiple pieces.

Figure 4:
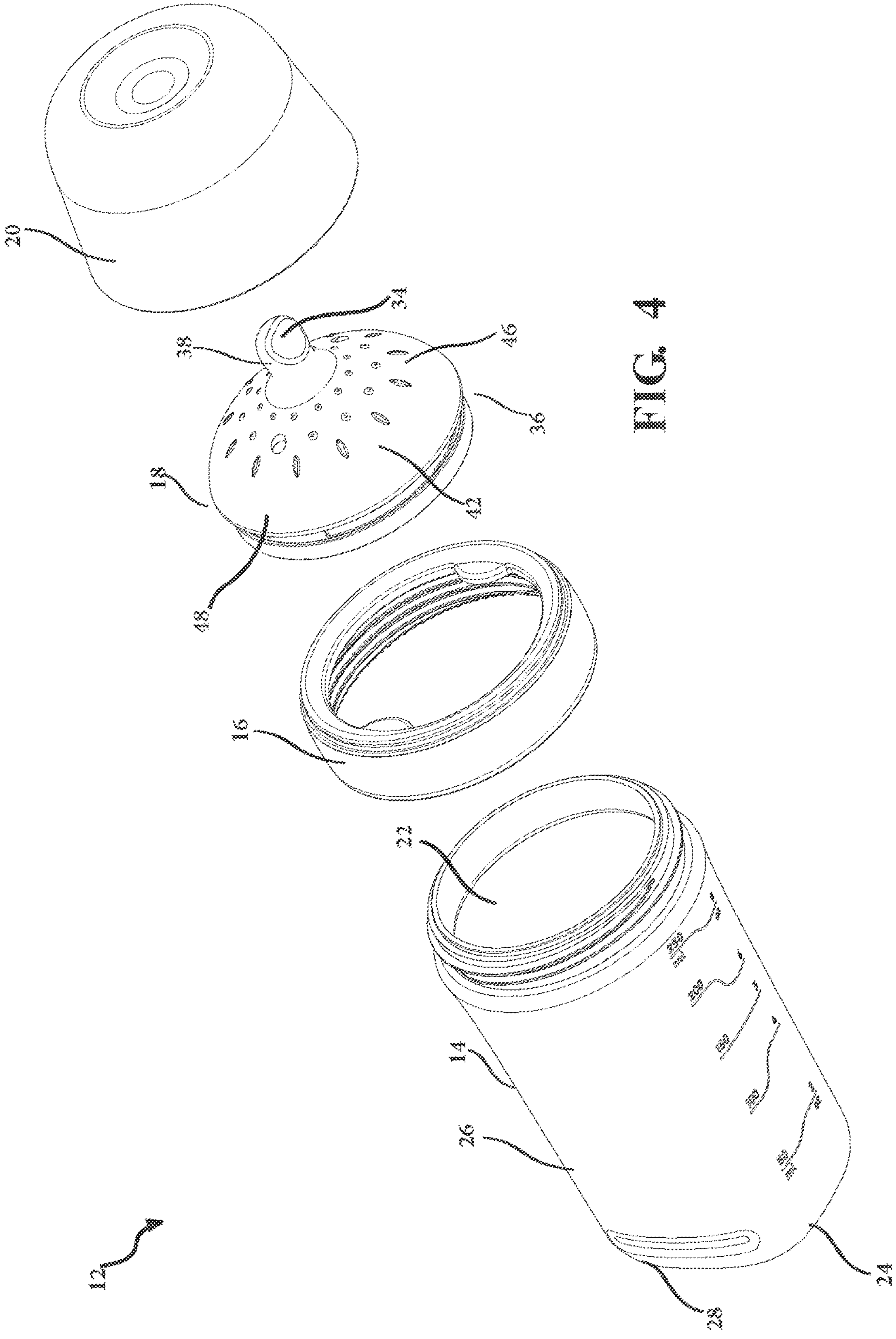
FIG. 4 illustrates a schematic exploded view of the bottle assembly illustrated in FIGS. 1-3.
Figure 5:
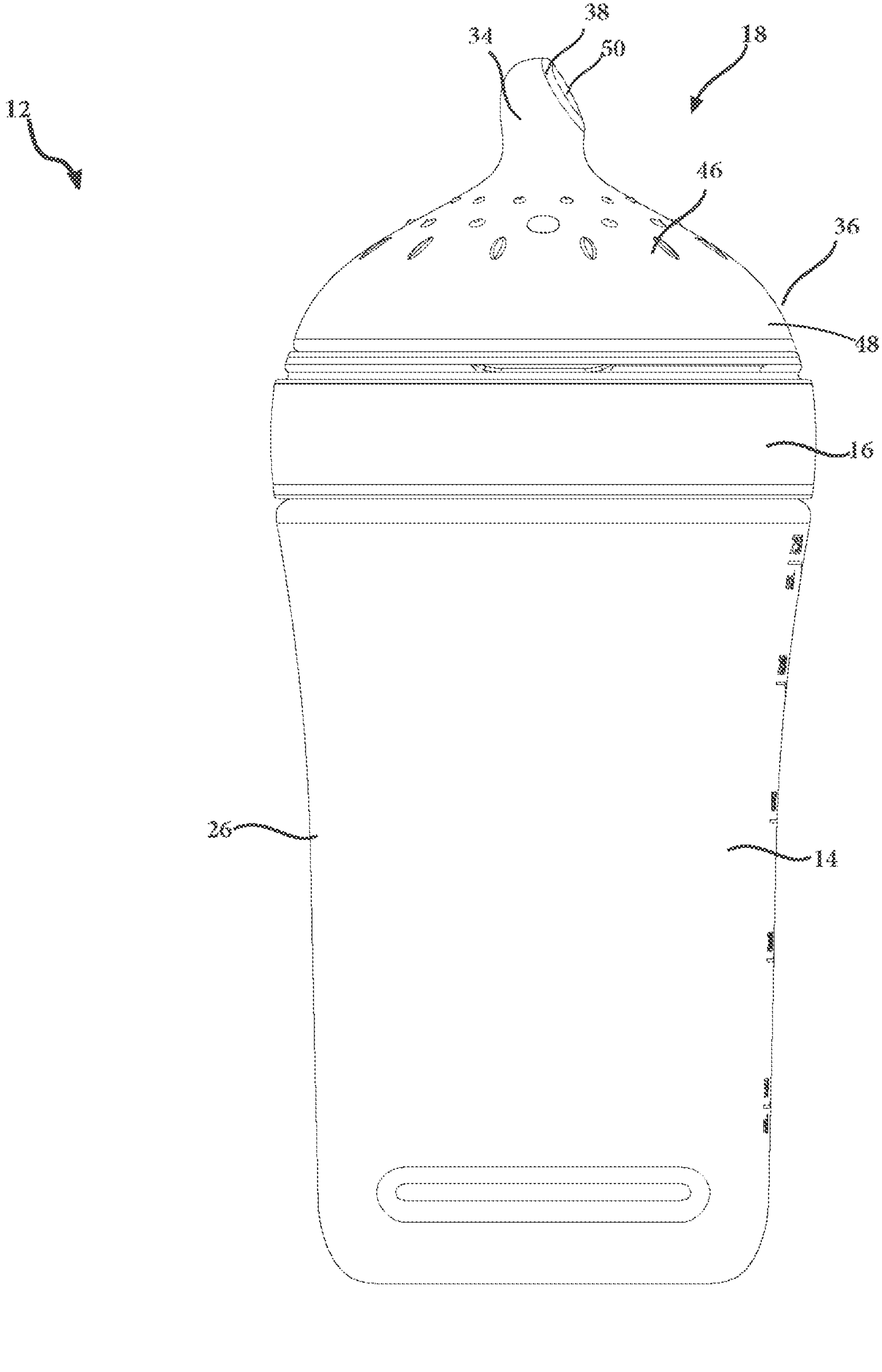
FIG. 5 illustrates a schematic side view of the bottle assembly illustrated in FIGS. 1-4.

As best seen in FIGS. 4 and 5 and as a non-limiting example, the bottle 14 has an open first end 22 and a closed second end 24. The bottle 14 has a body 26 between the first end 22 and the second end 24. The body 26 has a substantially rectangular shape that facilitates handling and manipulation of the bottle 14 by providing a portion that is easier to grasp. The result is a more ergonomic bottle 14. The diameter of the body 26 is smaller than the diameter of the first and second ends 22, 24.

In an embodiment, the diameter of at least one of the sides of the body 26 is smaller than the diameter of at least one other side of the body 26. For example, the front side of the body 26 may have a smaller diameter than the right side of the body 26 in order to provide for more comfortable gripping of the bottle 14. The second end 24 of the bottle 14 comprises a groove 28 adapted for attachment to the detachable unit 30. One of ordinary skill in the art would understand that the right side of the body 26 may either have a smaller diameter or the same diameter as the front side of the body 26 in other embodiments.

Figure 6:
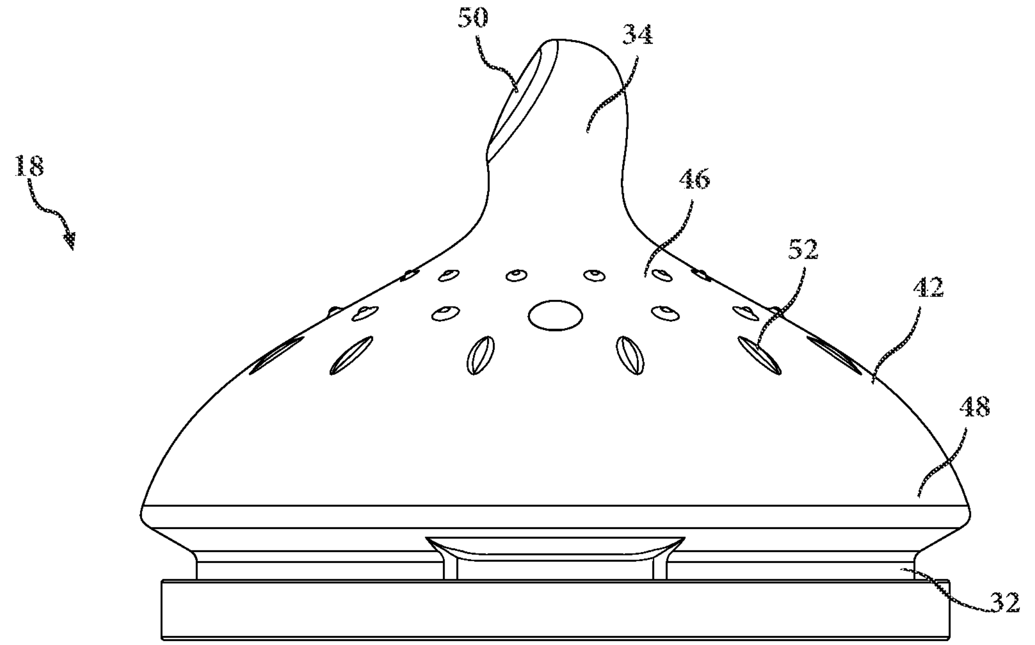
FIG. 6 illustrates a schematic perspective view of a nipple of the bottle assembly illustrated in FIGS. 1-5.

As best seen in FIG. 5 and as a non-limiting example, the ring 16 is mounted and preferably screwed into the first end 22 of the bottle 14. The nipple 18, as discussed in more detail below, includes a mounting flange 32 as seen in FIG. 6. The flange 32 substantially seals against a portion of the first end 22 of the bottle 14 when the ring 16 is screwed over the nipple 18 and onto the bottle 14. The ring 16 may be made from a variety of suitable materials, including polypropylene plastic. In an embodiment, the ring 16 has a diameter of between about 70 and 80 mm.

As best seen in FIGS. 4, 5 and 6 and as a non-limiting example, the nipple 18 includes a tip 34 having an outer surface 38 and a base 36 connected to the tip 34, wherein the base 36 includes an outer surface 42. The base 36 also includes an areola region 46 and a bulbous region 48. In this embodiment, the nipple 18 is not symmetrical from all sides. For example, the outer surface 38 may be thicker on one side of the tip 34 than the thickness of the outer surface 38 on at least one other side of the tip 34. In another example, the outer surface 42 may be thinner on one side of the base 36 than the thickness of the outer surface 42 on at least one other side of the base 36, such as the areola region 46. As a result, the tip 34 is inwardly tapered at the end having a thinner outer surface 38. The tapered shape of the tip 34 helps mimic the anatomical feature of a human nipple to promote proper latching of the baby. Specifically, the tapered shape of the tip 34 causes the baby to slide past the tip 34 and onto the areola region 46 to help a baby avoid nipple confusion.

The tip 34 is elongated to simulate the extension of the tip 34 of a tit of a woman's breast during breastfeeding. In an embodiment, the nipple 18 may be made from hygienic silicone. The nipple 18 may have a height of between about 40-50 mm from the flange 32 to the top of the tip 34, while the tip 34 may have a height of between about 15-20 mm. One of ordinary skill in the art would understand that the tip 34 may have other dimensions and configurations in other embodiments.

In some embodiments, tips may be inverted to better simulate anatomical conditions found in women's breasts or may be configured to move, such as being able to twist or pop out.

As best seen in FIGS. 5 and 6 and as a non-limiting example, the side of the tip 34 having a thinner outer surface 38 has a hole 50 therethrough. One of ordinary skill in the art would understand that the hole 50 may be positioned in other locations on the tip 34 and that more than one hole may exist. The hole 50 is configured to allow a baby to consume the liquid or food contents found within the bottle 14.

In some embodiments, the nipple 18 may be infused with an additional liquid or food item or a microorganism, in addition to the liquid or food already present within the bottle 14. The liquid or food item may be added on, around, or within the tip 34 and/or the base 36 of the nipple 18. The nipple 18 may be infused with the liquid or food item in a variety of ways including, but not limited to, a second outer layer/surface on the nipple 18 or through the use of nanoparticles. The additional outer layer/surface serves to trap the food or liquid. A variety of different types of food and/or liquid may be used, such as formula, breast milk, natural flavor, probiotics, etc.

The outer surface 42 of the base 36 of the nipple 18 may be made from a variety of suitable materials, including plastics, rubber materials, or polymers, such as silicone. In an embodiment, the outer surface 42 of the areola region 46 may be designed to simulate the areola of a woman's breast by having an outwardly curved, convex, or raised appearance and feel. This raised/textured appearance and feel on the outer surface 42 allows a baby to latch on to the areola region 46 just as a baby would latch onto the areola of a woman's breast during breast-feeding. In an embodiment, at least a portion of the areola region 46 has a different texture, surface geometry, or feel as compared to at least a portion of the bulbous region 48. This allows for a baby to receive a signal for latching on and grip for latching on as compared with other portions of the nipple 18.

The base 36 of the nipple 18 also comprises an inner surface that is configured to mimic fibrous breast tissue. The outer surface 42 and/or the inner surface of the base 36 may include raised portions in the form of bumps 52. The amount and configuration of the bumps 52 found on the outer surface 42 and/or the inner surface of the base 36 may vary.

Each of the inner surface and the outer surface 38 of the tip 34 and the inner surface and the outer surface 42 of the base 36 may have a variety of different textures, surface geometries, colors, and configurations. Specifically, the nipple 18 may be made from different types of materials to provide for a different feel and texture for the baby, such as using harder or softer materials.

Even though the embodiment disclosed herein shows bumps 52 on the nipple 18, the nipple 18 may also have dimples, ribs, or other non-smooth textures. Also, in some embodiments, the areola region 46 may be made from a different type of material than the bulbous region 48. For example, the areola region 46 may be made from silicone, while the bulbous region 48 may be made from a plastic. Also, the outer surface 44 of the base 36 may be made from a different material than the outer surface 38 of the tip 34. Some of the materials may be used to regulate the temperature of the nipple 18.

The bulbous region 48 is designed to simulate the region of a woman's breast that surrounds the areola region. In an embodiment, the bulbous region 48 has an outwardly curved or convex shape and the surface area of the bulbous region 48 is greater than the surface area of the areola region 46. The bulbous region 48 is connected to the flange 32. The flange 32 may be circular in shape and may allow the ring 16 or other securing devices to sealingly engage the nipple 18 to the bottle 14.

As best seen in FIGS. 1, 2, and 4, the bottle cap 20 is configured to fully surround and enclose the nipple 18 and to be positioned above the ring 16. When a baby is feeding from the bottle assembly 12, the bottle cap 20 is removed. The bottle cap 20 is then re-inserted when the baby is no longer feeding from the bottle assembly 12. The bottle cap 20 may have a variety of different configurations and sizes. In an embodiment, the cap 20 has substantially rectangular shaped sides and a substantially circular shaped top portion.

FIGS. 10-13 are views of a baby bottle system 200 including the bottle assembly 12 illustrated in FIGS. 1-5 and described above, and a detachable unit 230 according to an alternative embodiment of the disclosure. In this embodiment, the detachable unit 230 is also a detachable base made of polypropylene. The bottle 14 is selectively inserted into a cavity 258 on a first portion 264 of the detachable unit 230.

Figure 11:
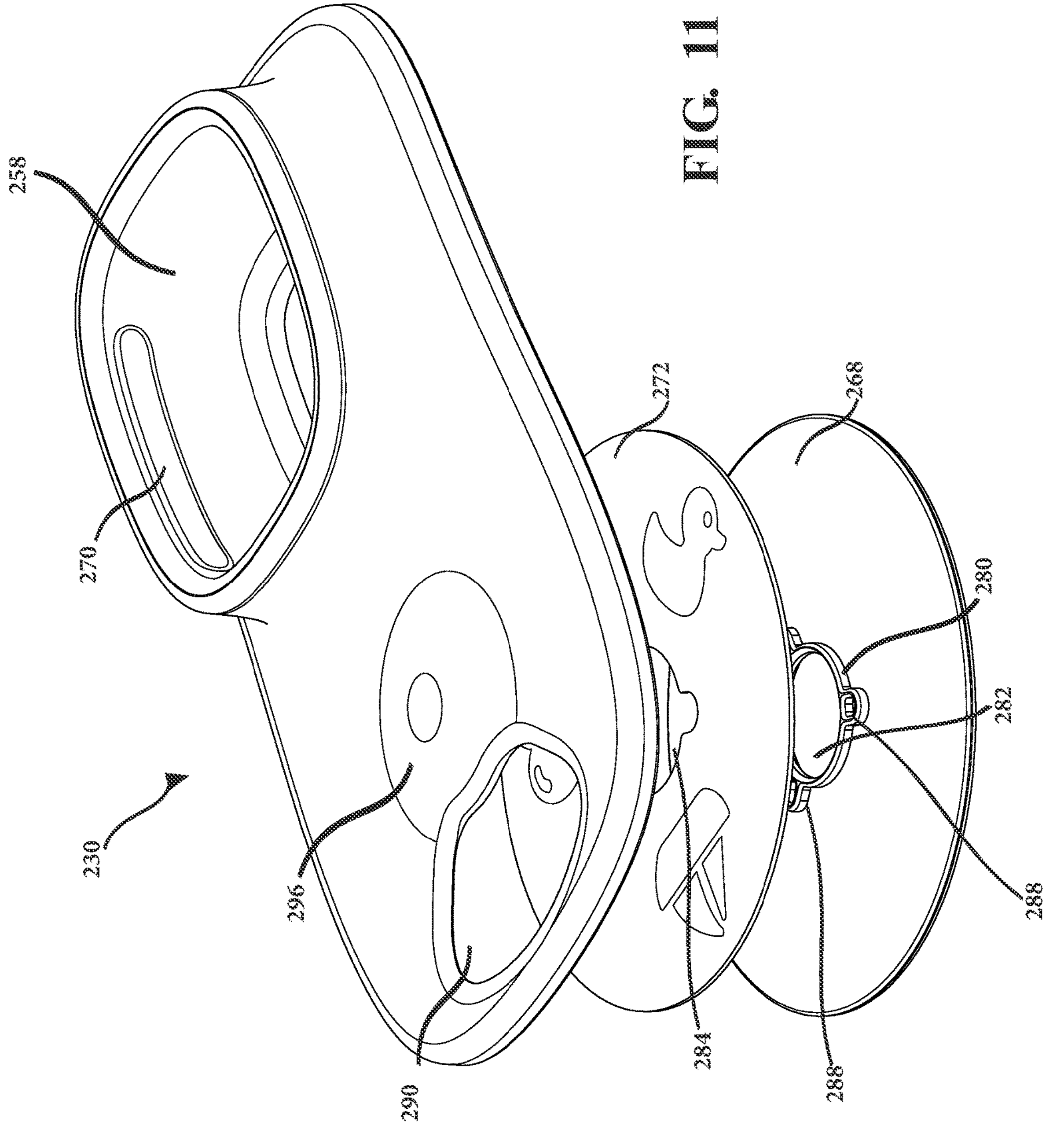
FIG. 11 illustrates a schematic exploded view of the detachable unit illustrated in FIG. 10.
Figure 12:
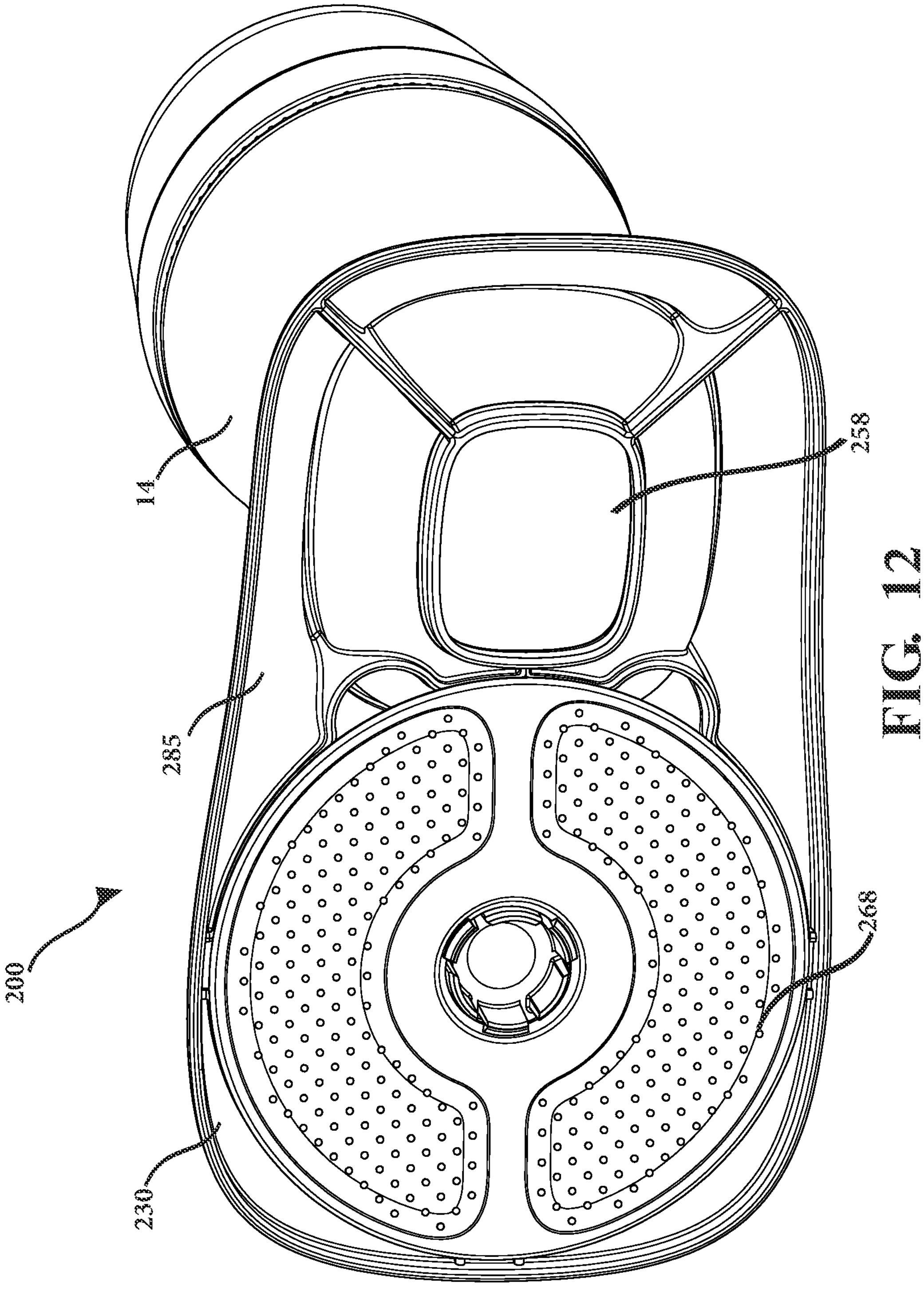
FIG. 12 illustrates a schematic bottom view of the detachable unit illustrated in FIGS. 10 and 11.

As best seen in FIGS. 11 and 12 and as a non-limiting example, one or more accessories 272 are removably inserted into the detachable unit 230. The one or more accessories 272 are designed to stimulate a baby's cognitive and emotional development when the baby is feeding from the bottle 14. In this embodiment, the one or more accessories 272 are flashcards that are individually and removably inserted into the detachable unit 230.

As best seen in FIGS. 11 and 12 and as a non-limiting example, one or more flashcards 272 are removably inserted into and retained within a circular base 268 on the bottom side 285 of the detachable unit 230. In this embodiment, the base 268 includes a substantially circular rim 280 defining a hole 282 in the center of the base 268. A plurality (e.g. 3) of protrusions 288 extend radially from the circular rim 280. The base 268 may be made from a variety of materials, such as polypropylene. The amount and shape of protrusions on bases may vary in other embodiments. In other embodiments, bases of the detachable unit may not include any protrusions therein or the bases may include less than three or more than three protrusions extending therein.

Figure 14:
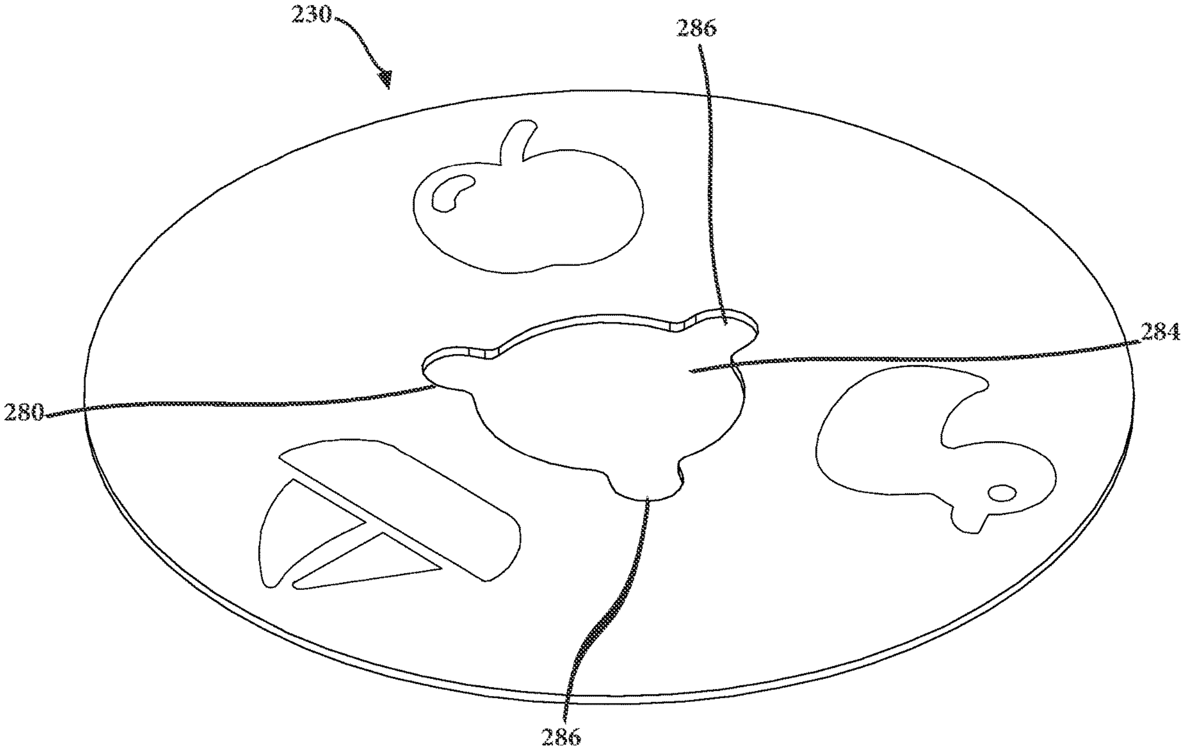
FIG. 14 illustrates a schematic perspective view of a flashcard.

As best shown in FIGS. 11 and 14, each of the flashcards 272 has substantially the same shape as the base 268. For example, each of the flashcards 272 are circular and have a hole 284 in the center of the flashcards 272. In an embodiment, the hole 284 is substantially circular and includes a plurality (e.g. 3) of narrow, spaced apart slits 286. Each of the flashcards 272 have a diameter that is slightly less than the diameter of the base 268 to allow the flashcards 272. As a result, the flashcards 272 may be selectively inserted into the circular base 268 and press fit between the base 268 and the bottom side 285 of the detachable unit 230.

In an embodiment, the three protrusions 288 on the base 268 insert into the three slits 286 on the flashcard so that the hole 284 in the center of the flashcard 272 is aligned with the hole 282 in the center of the base 268 when the flashcard 272 is fit into the base 268. Since the base 268 is press fit to the bottom side 285 of the detachable unit 230, it may be readily removed from the detachable unit 230 in order to replace the flashcard 272. In some embodiments, either less than three or more than three protrusions on a base are inserted into either less than three or more than three sections on the flashcard. In other embodiments, flashcards may be press fit into bases without the alignment of any protrusions.

Figure 10:
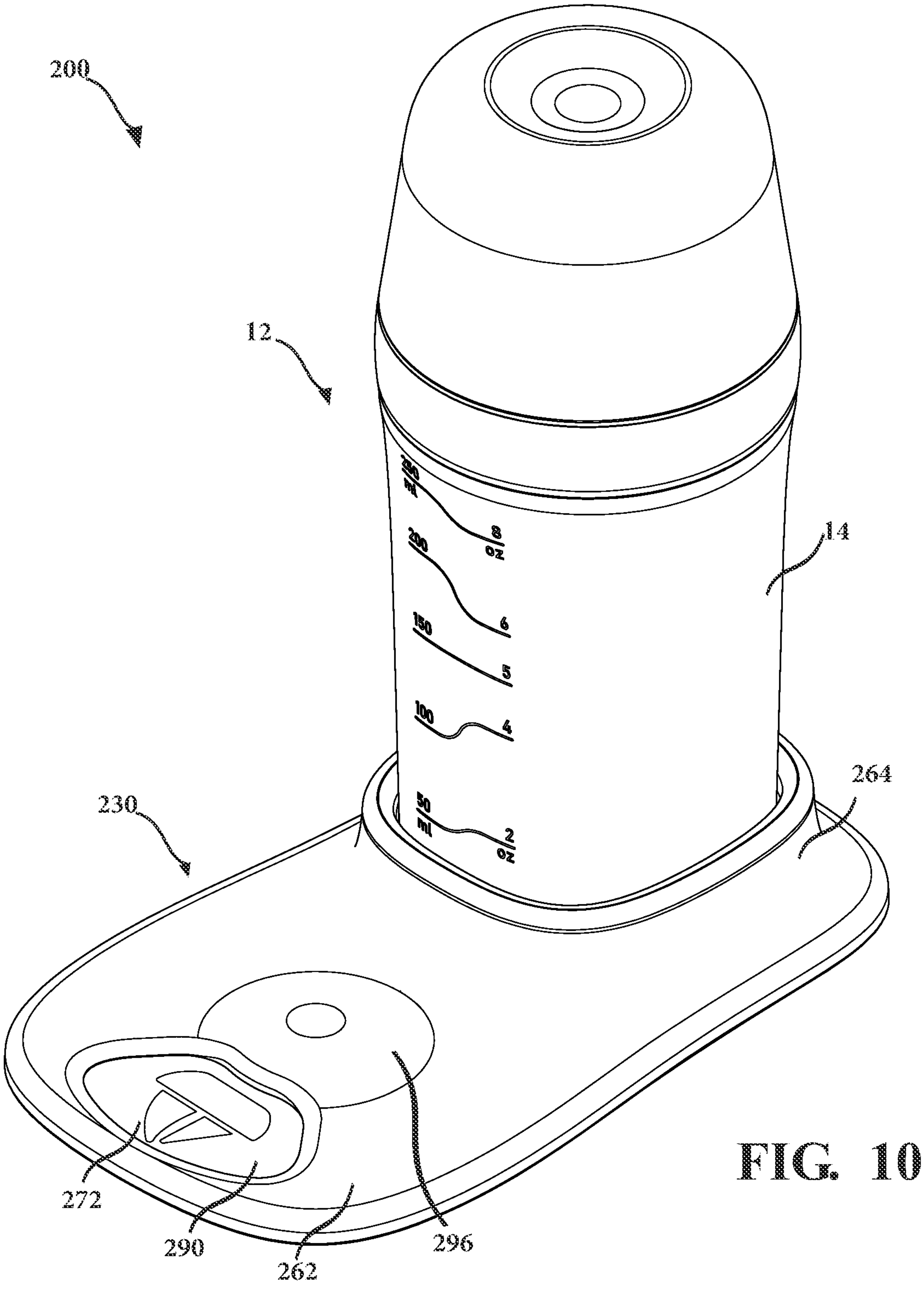
FIG. 10 illustrates a schematic perspective view of a baby bottle system including the bottle assembly illustrated in FIGS. 1-5 and a detachable unit according to an alternative embodiment of the disclosure.

As best seen in FIGS. 10 and 11, a first end 294 of the inner rim 292 overlaps at least a portion of a spinning assembly 296 on the second portion 262 of the detachable unit 230. When the flashcard 272 is positioned between the base 268 and the bottom side 285 of the detachable unit 230, the spinning assembly 296 is aligned over the hole 284 in the center of the flashcard 272 which is aligned with the hole 282 in the center of the base 268. In this embodiment, the spinning assembly 296 is substantially circular in shape to allow an operator to more easily control the spinning assembly 296 with his/her finger. An operator can rotate the spinning assembly 296 with his/her finger to spin the flashcard 272 in the base 268 in clockwise and counter-clockwise directions in order to display a different image from the flashcard 272 in the opening 290. As a result, different images from the flashcard 272 may be displayed in the opening 290 while a baby is feeding from the bottle 14. The spinning assembly 296 may have a variety of different shapes, configurations, and sizes so long as it can be readily rotated by a finger in order to spin a flashcard.

As best seen in FIG. 14 and as a non-limiting example, each flashcard 272 has a plurality of different images (e.g. 3) that are spaced apart on the flashcard 272. In this embodiment, each of the images is black and white. The amount, type, design, color, and pattern of the images may vary for other flashcards. The flashcards 272 disclosed herein may be made from a variety of materials, such as plastic.

Figure 13:
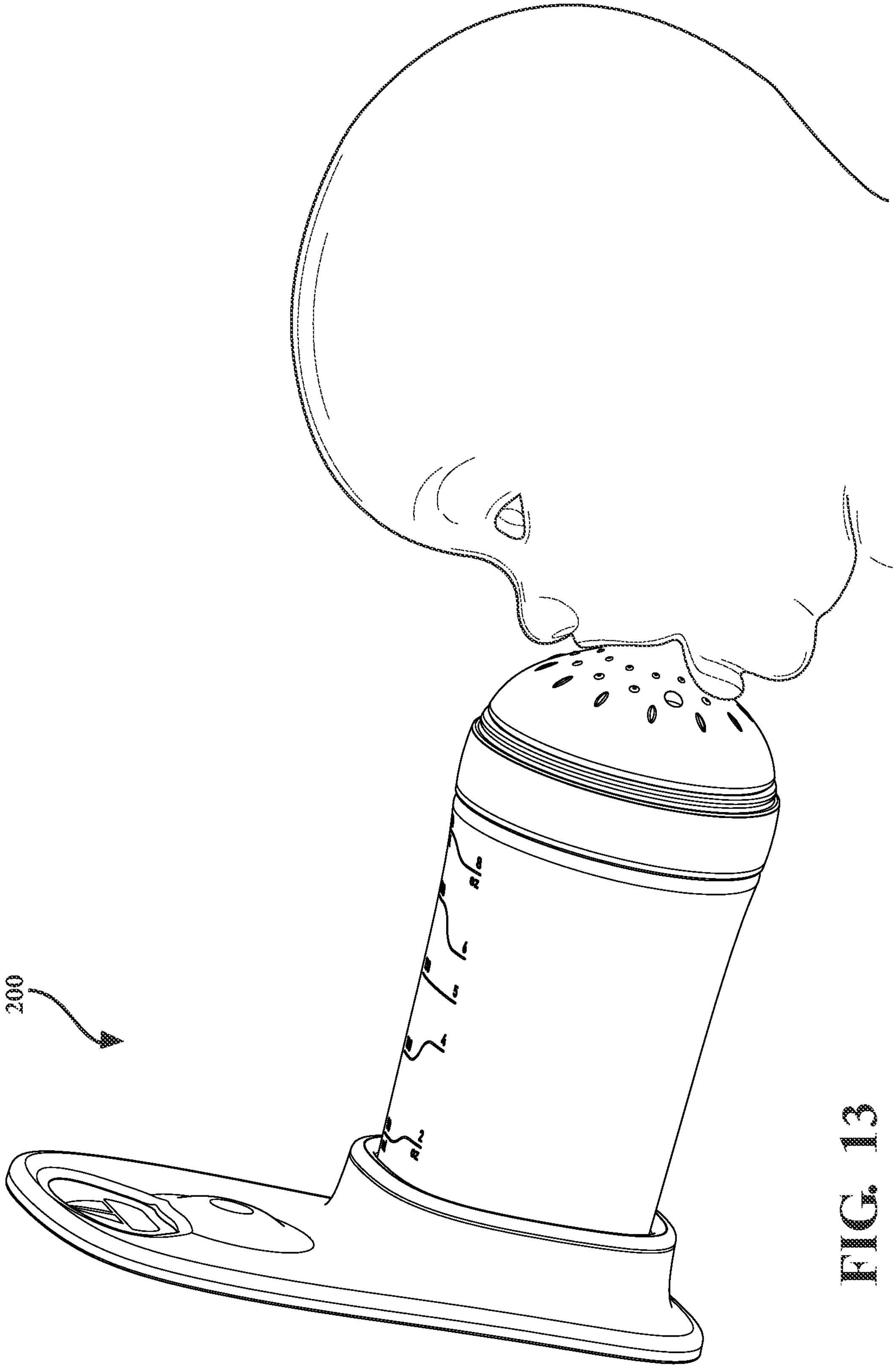
FIG. 13 illustrates a schematic perspective view of the baby bottle system illustrated in FIGS. 10-12 in operation.

An outer frame 260 surrounds the first and second portions 264, 262 of the detachable unit 230. The second portion 262 includes an opening 290 defined by an inner rim 292. The opening 290 allows for an image from the flashcard 272 to be visible to a baby when the baby is feeding from the bottle 14. As best seen in FIG. 13, the bottle 14 and the detachable unit 30 are angled towards the baby when the baby is feeding such that the image from the flashcard 272 is in the baby's line of sight.

The first portion 264 of the detachable unit 230 extends upward at a slope from the second portion 262 of the detachable unit 230. The first portion 264 includes an outer rim 266 defining the cavity 258 for receiving the bottle 14. The cavity 258 may include a rubber strip 270 extending at least partially therein. The rubber strip 270 is adapted to interact with one or more portions on the bottle 14 to securely retain the bottle 14.

FIGS. 15-18 are views of a baby bottle system 300 including the bottle assembly 12 illustrated in FIGS. 1-5 and described above, and a detachable unit 330 according to an alternative embodiment of the disclosure. In this embodiment, the detachable unit 330 is also a detachable base made of polypropylene. The bottle 14 is selectively inserted into a cavity 358 located at about the center of the detachable unit 330.

Figure 18:
FIG. 18 illustrates a schematic perspective view of the baby bottle system illustrated in FIGS. 14-16 in operation.

In this embodiment, the detachable unit 330 has opposing left and right sides 340, 342 and opposing front and rear sides 350, 352. The detachable unit 330 also comprises two openings 320, wherein the cavity 358 is positioned between each of the openings 320. Each of the left and right sides 340, 342 has a plurality of spaced ridges 345 wrapped around the sides 340, 342. The ridges 345 form edges of each of the openings 320 on the left and right sides 340, 342. As a result, the left and right sides 340, 342 are configured to act as handles for the detachable unit 330. As best seen in FIG. 18, an operator of the detachable unit 330 can position the baby bottle system 300 in a proper position for the baby by holding on to the left and right sides 340, 342.

Figure 15:
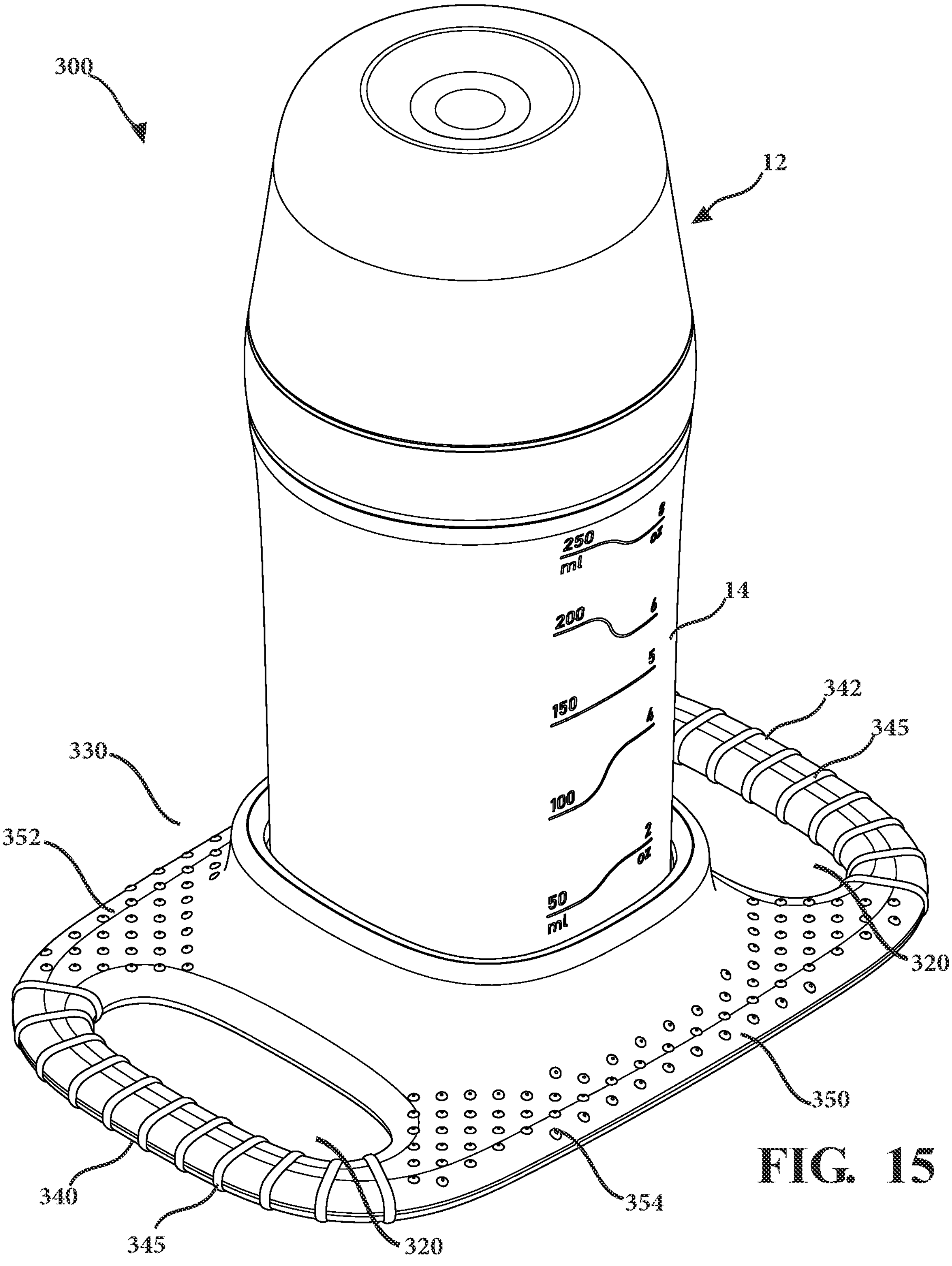
FIG. 15 illustrates a schematic perspective view of baby bottle system including a bottle assembly and a detachable unit according to another alternative embodiment of the disclosure.
Figure 16:
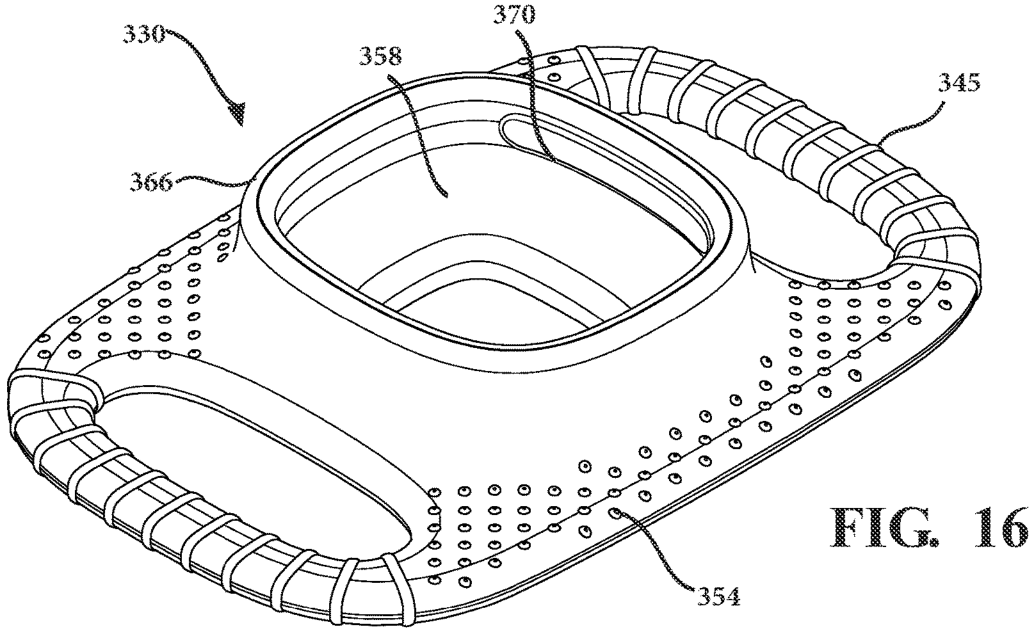
FIG. 16 illustrates a schematic top perspective view of the detachable unit illustrated in FIG. 14.
Figure 17:
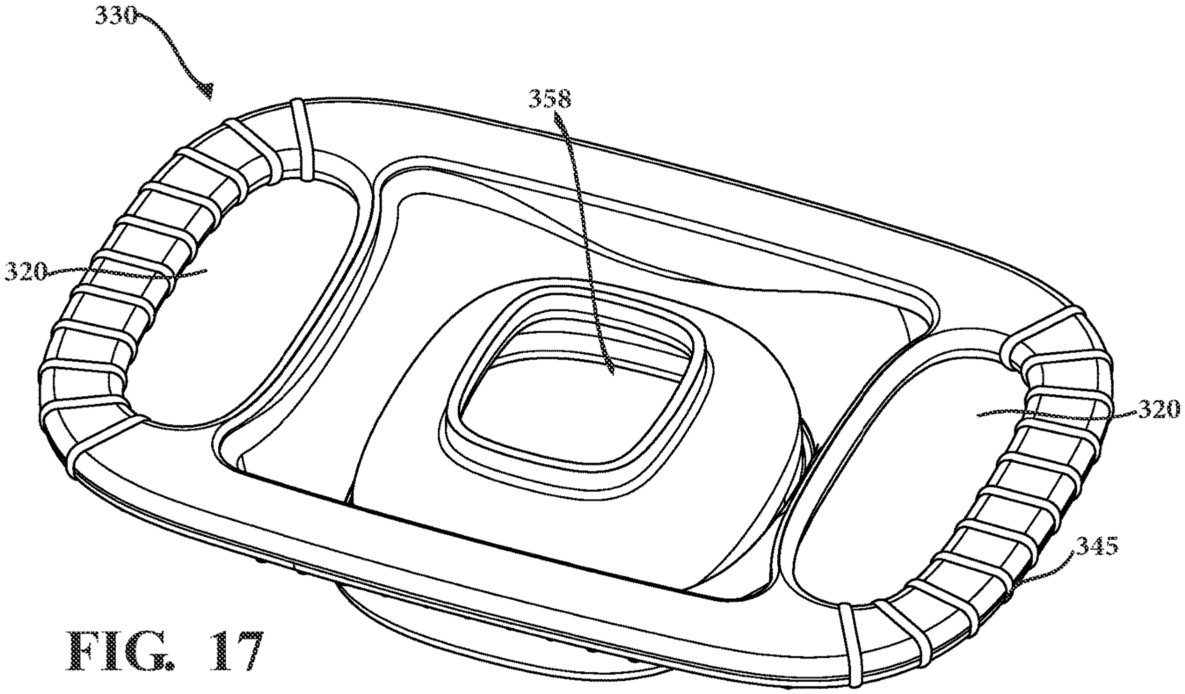
FIG. 17 illustrates a schematic bottom perspective view of the detachable unit illustrated in FIGS. 14 and 15.

As best seen in FIGS. 15 and 16 and as a non-limiting example, the surfaces of the front and rear sides 350, 352 of the detachable unit 330 have raised portions in the form of bumps 354. While feeding from the bottle 14, a baby may reach out and touch the bumps 354 on the surfaces of the front and rear sides 350, 352. The bumps 354 may have a variety of sizes, shapes, configurations, and patterns. In some embodiments, either one surface or more than two surfaces of a detachable unit may have bumps.

As best seen in FIG. 16 and as a non-limiting example, an outer rim 366 defines the cavity 358 for receiving the bottle 14. The cavity 358 may be a rubber strip 370 extending at least partially therein. The rubber strip 370 is adapted to interact with one or more portions on the bottle 14 to securely retain the bottle 14.

In other embodiments, detachable units may have other shapes, configurations, and sizes to accommodate different types and kinds of attachments, while still being able to selectively attach and retain a bottle therein. For example, the detachable unit may be fastened around the baby bottle using elastic/rubber via a ring-like structure around the bottle.

Some of the significant benefits of the present disclosure include the ability to enhance a baby's feeding routine; to stimulate a baby's cognitive and emotional development; and to prevent nipple/bottle confusion as compared with conventional baby bottles.

It is to be understood that the various embodiments described in this specification and as illustrated in the attached drawings are simply exemplary embodiments illustrating the inventive concepts as defined in the claims. As a result, it is to be understood that the various embodiments described and illustrated may be combined to from the inventive concepts defined in the appended claims.

In accordance with the provisions of the patent statutes, the present disclosure has been described to represent what is considered to represent the preferred embodiments. However, it should be noted that this disclosure can be practiced in other ways than those specifically illustrated and described without departing from the spirit or scope of this disclosure.

What is claimed is:

1. A baby bottle system comprising:
- a bottle assembly comprising:
  - a bottle adapted to contain a volume of liquid or food, wherein the bottle has an open first end, a closed second end, and a body interposed between the first and second ends;
  - a nipple engaged with the bottle, the nipple comprising:
    - a tip having an outer surface and an inner surface, wherein the outer surface is thicker at a first end of the tip than at a second end of the tip, and wherein the second end of the tip has a hole therethrough; and
    - a first base connected to the tip, wherein the first base comprises:
      - a first region having a curved shape; and
      - a second region connected to the first region, wherein the second region has a textured surface;
  - a ring mounted over a portion of the nipple and onto the first end of the bottle, wherein the ring is configured to sealingly engage the nipple to the bottle; and
- a detachable unit configured to stimulate one or more senses of a baby, the detachable unit including first and second opposed ends, the detachable unit comprising:
  - a cavity including a circumferentially continuous inner surface configured to receive and retain the second end of the bottle and a portion of the body of the bottle therein, the cavity being situated adjacent the first opposed end of the detachable unit, the cavity being configured to hold the bottle substantially perpendicular to the detachable unit; and
  - a circumferentially continuous outer rim defining an open top of the cavity;
  - a compartment configured to receive an accessory, the compartment being situated adjacent the second opposed end of the detachable unit to hold the accessory therein, the accessory being selectively inserted into the detachable unit;
  - an outer frame; and
  - an adjustable inner frame surrounding one or more portions of the compartment adjacent the second opposed end of the detachable unit, the adjustable inner frame being raisable and lowerable for ingress and egress of the accessory with respect to the compartment.

2. The baby bottle system of claim 1, wherein the accessory comprises a cloth, a fabric, a card, a sound chip, or any combinations thereof.

3. The baby bottle system of claim 1, wherein the cavity includes an inner surface having a rubber strip therein, wherein the rubber strip is configured to interact with the second end of the bottle.

4. The baby bottle system of claim 2, wherein the accessory comprises a card that includes an image to stimulate a baby when the baby feeds from the baby bottle system.

5. A baby bottle system comprising:
- a bottle assembly comprising:
  - a bottle adapted to contain a volume of liquid or food, wherein the bottle has an open first end, a closed second end, and a body interposed between the first and second ends;
  - a nipple engaged with the bottle, the nipple comprising:
    - a tip having an outer surface and an inner surface, wherein the outer surface is thicker at a first end of the tip than at a second end of the tip, and wherein the second end of the tip has a hole therethrough; and
    - a first base connected to the tip, wherein the first base comprises:
      - a first region having a curved shape; and
      - a second region connected to the first region, wherein the second region has a textured surface;
  - a ring mounted over a portion of the nipple and onto the first end of the bottle, wherein the ring is configured to sealingly engage the nipple to the bottle; and
- a detachable unit configured to stimulate one or more senses of a baby, the detachable unit including first and second opposed ends, the detachable unit comprising:
  - a cavity including a circumferentially continuous inner surface configured to receive and retain the second end of the bottle and a portion of the body of the bottle therein, the cavity being situated adjacent the first opposed end of the detachable unit, the cavity being configured to hold the bottle substantially perpendicular to the detachable unit; and
- a circumferentially continuous outer rim defining the cavity;
- a compartment configured to receive an accessory, the compartment being situated adjacent the second opposed end of the detachable unit to hold the accessory therein, the accessory being selectively inserted into the detachable unit, wherein the accessory comprises a scented cloth;
- an outer frame; and
- an adjustable inner frame surrounding one or more portions of the compartment adjacent the second opposed end of the detachable unit, the adjustable inner frame being raisable and lowerable for ingress and egress of the accessory with respect to the compartment.

6. A baby bottle system comprising:
- a bottle assembly comprising:
  - a bottle adapted to contain a volume of liquid or food, wherein the bottle has an open first end, a closed second end, and a body interposed between the first and second ends;
  - a nipple engaged with the bottle, the nipple comprising:
    - a tip having an outer surface and an inner surface, wherein the outer surface is thicker at a first end of the tip than at a second end of the tip, and wherein the second end of the tip has a hole therethrough; and a first base connected to the tip, wherein the first base comprises:

a first region having a curved shape; and a second region connected to the first region, wherein the second region has a textured surface;

a ring mounted over a portion of the nipple and onto the first end of the bottle, wherein the ring is configured to sealingly engage the nipple to the bottle; and a detachable unit configured to stimulate one or more senses of a baby, the detachable unit including first and second opposed ends, the detachable unit comprising:

a cavity including a circumferentially continuous inner surface configured to receive and retain the second end of the bottle and a portion of the body of the bottle therein, the cavity being situated adjacent the first opposed end of the detachable unit, the cavity being configured to hold the bottle substantially perpendicular to the detachable unit; and a circumferentially continuous outer rim defining the cavity;

a compartment configured to receive an accessory, the compartment being situated adjacent the second opposed end of the detachable unit to hold the accessory therein, the accessory being selectively inserted into the detachable unit;

an outer frame; and an adjustable inner frame surrounding one or more portions of the compartment adjacent the second opposed end of the detachable unit, the adjustable inner frame being raisable and lowerable for ingress and egress of the accessory with respect to the compartment, wherein the adjustable inner frame includes a latch configured to attach the adjustable inner frame to the outer frame and to retain the accessory in the compartment.

* * * * *